Jan. 13, 1931.  H. J. GAISMAN ET AL  1,788,570
MEANS FOR ASSEMBLING BLADES
Filed Feb. 4, 1927   5 Sheets-Sheet 1

INVENTOR
H. J. Gaisman
BY C. Schumacher
T. F. Bourne
ATTORNEY

Jan. 13, 1931. H. J. GAISMAN ET AL 1,788,570
MEANS FOR ASSEMBLING BLADES
Filed Feb. 4, 1927 5 Sheets-Sheet 2

INVENTOR
H. J. Gaisman
BY C. Schumacher
P. E. Bourne
ATTORNEY

Jan. 13, 1931.   H. J. GAISMAN ET AL   1,788,570
MEANS FOR ASSEMBLING BLADES
Filed Feb. 4, 1927    5 Sheets-Sheet 4

INVENTOR
H. J. Gaisman
C. Schumacher
BY
P. F. Boursal
ATTORNEY

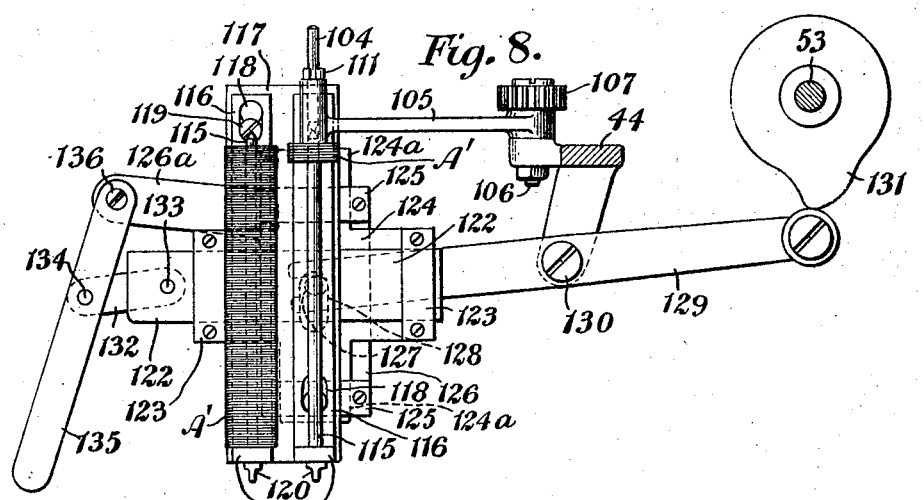
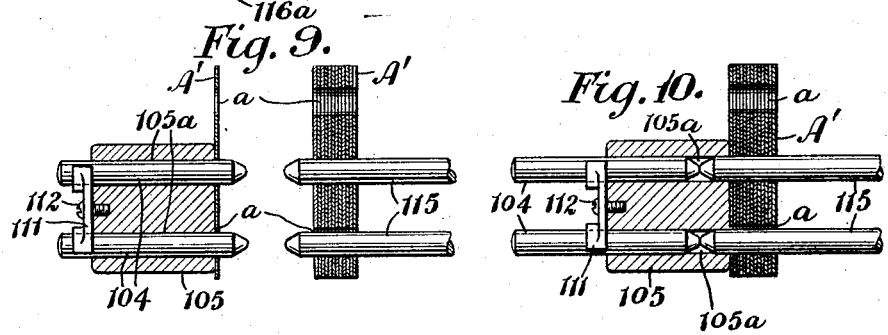
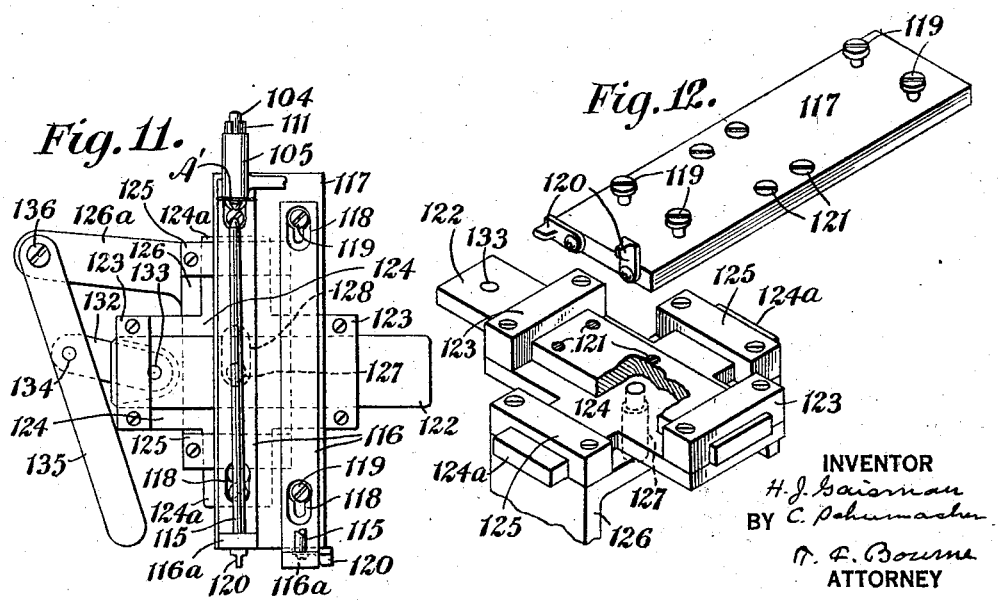

Patented Jan. 13, 1931

1,788,570

UNITED STATES PATENT OFFICE

HENRY J. GAISMAN, OF NEW YORK, AND CONRAD SCHUMACHER, OF LYNBROOK, NEW YORK, ASSIGNORS TO AUTOSTROP SAFETY RAZOR CO., INC., OF NEW YORK, N. Y., A CORPORATION OF NEW YORK

MEANS FOR ASSEMBLING BLADES

Application filed February 4, 1927. Serial No. 165,903.

An object of this invention is to assemble blades side by side without requiring the blades to be handled individually, thereby to prevent injury to their sharpened edges. The invention comprises novel details of improvement that will be more fully hereinafter set forth and then pointed out in the claims.

Reference is to be had to the accompanying drawings forming a part hereof, wherein Fig. 1 is a plan view of strip cutting-off and blade assembling mechanism;

Fig. 8 is a detail plan view illustrating the blade receiving and assembling devices;

Figs. 9 and 10 are sectional plan details illustrating devices for transferring and assembling the blades;

Fig. 11 is a detail view substantially similar to Fig. 8, showing parts in a different position, and Fig. 12 is a perspective view showing parts of Fig. 11 in detached relation.

Similar numerals of reference indicate corresponding parts in the several views.

The numeral 1 indicates a main frame which may be of any suitable construction. At A is indicated a perforated sharpened strip, which strip presents blades to a position to be assembled side by side.

Figure 1:
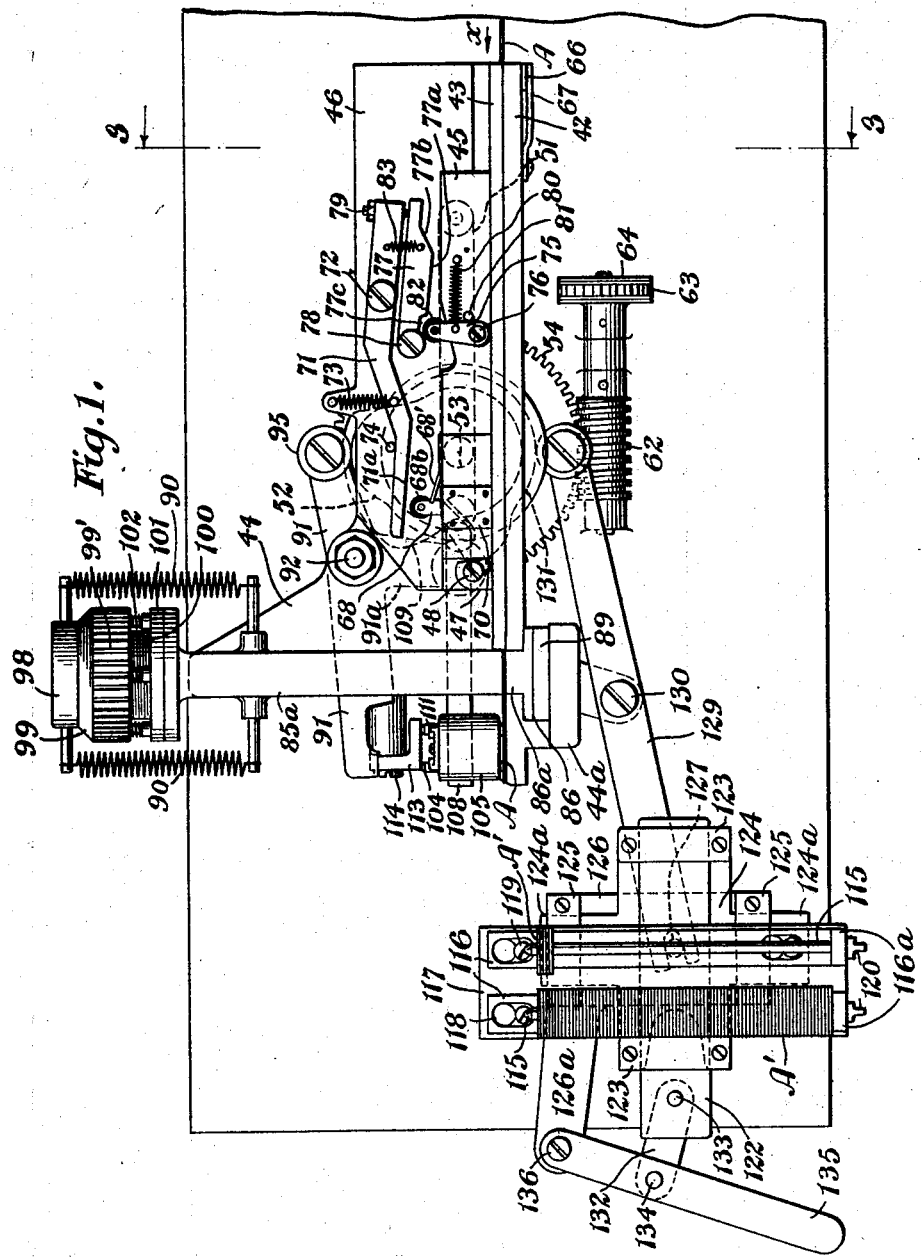
Figure 2:
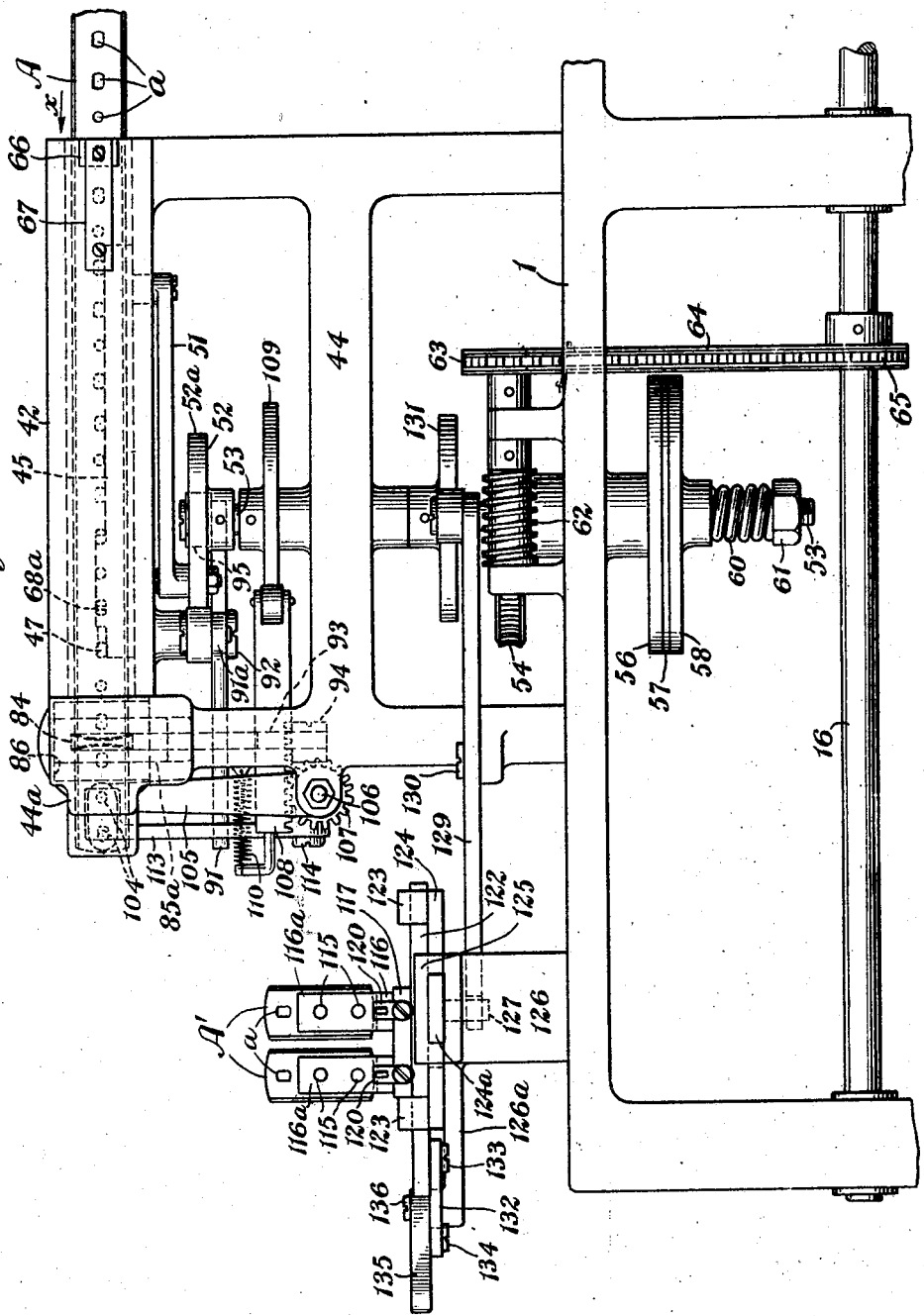
Fig. 2 is a front elevation of Fig. 1.
Figure 3:
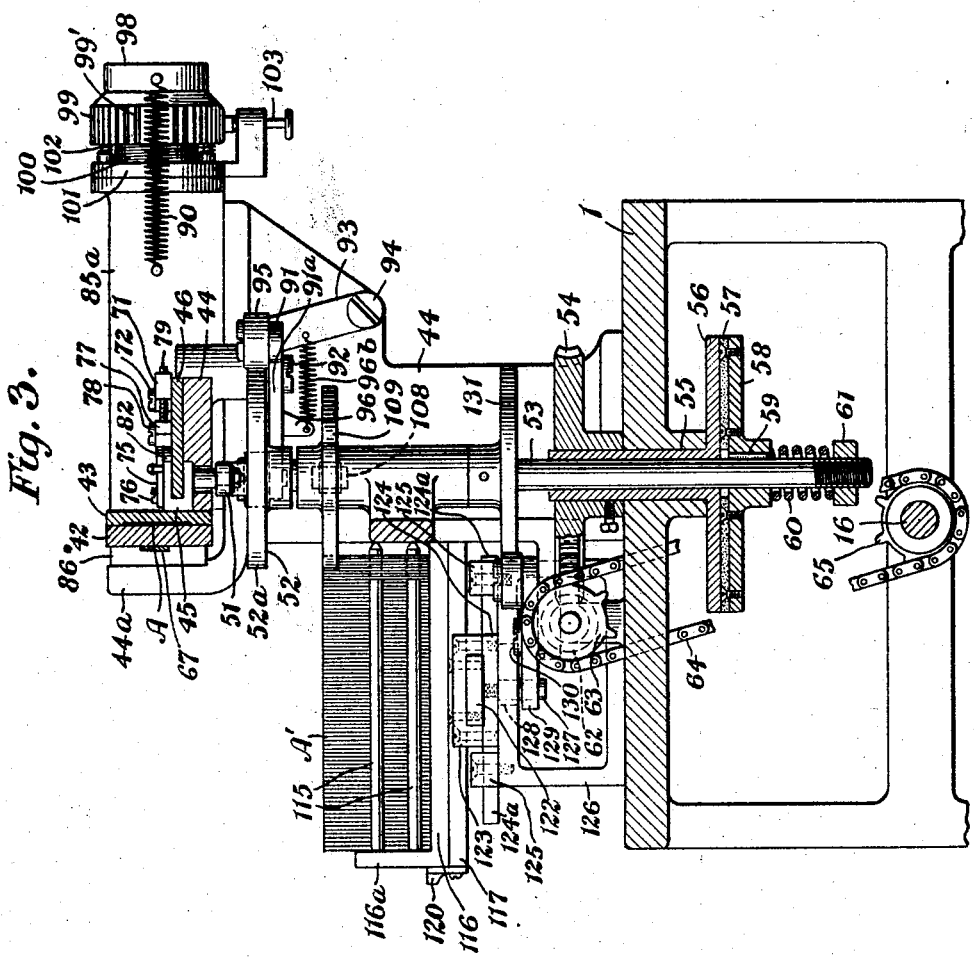
Fig. 3 is a section on line 3, 3, in Fig. 1.
Figure 7:
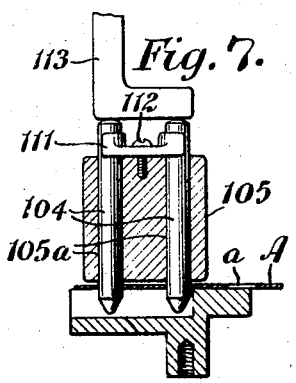
Fig. 7 is a detail section substantially on the plane of line 7, 7, in Fig. 4.

The blades A' are presented successively in position to be received on pins 104. In the example illustrated the blades may be cut off from the sharpened perforated strip A by means of a tool 84, (Fig. 2), to be operated in any suitable or desired way, the strip to be fed step by step for each blade by any suitable means, to present the blades in cooperative relation to the pins 104. Said pins enter apertures or perforations a in the blade A' to support the blade and move it to a blade-assembling position. The pins 104 are slidable in bores 105a in an arm 105 pivotally supported at 106 on framing 44 of main frame 1, (Figs. 2 and 4–7). The arm 105 is provided with a gear 107 in mesh with a slidable rack 108 guided on framing 44 and operative by a cam 109 on shaft 53, a spring 110 connecting rack 108 with framing 44 operating the rack in opposition to said cam, (Figs. 1, 2, 4, 5 and 8), whereby for each rotation of cam 109 the arm 105 will be rocked from the position shown in Fig. 4 to the position shown in Fig. 5, and vice-versa. Shaft 53 is journaled in suitable bearings in framing 44, (Figs. 2 and 3). Shaft 53 is rotated by the medium of frictional devices and gearing shown comprising a worm wheel 54 secured to a sleeve 55 receiving shaft 53 and provided with a friction disk 56 in engagement with a friction member 57 secured to a disk 58 surrounding shaft 53 and slidably connected therewith by a key at 59, a spring 60 on said shaft bearing against disk 58 and against a stop nut 61 on shaft 53, (Figs. 2 and 3). Worm wheel 54 is rotated by a worm 62 journaled in bearings on frame 1 and provided with a sprocket wheel 63 receiving chain 64 from a sprocket wheel 65 on drive shaft 16. The pins 104 are slidably resisted by a friction member 111 secured on arm 105 by screw 112, so that the pins will remain in set position, (Figs. 9 and 10). The pins 104 are pushed toward a blade, to enter the pins in adjacent apertures thereof, as the blades are presented by the strip A, by means of an arm 113 pivotally supported at 114 upon framing 44, the arm 113 being in position to be operated by the free end of arm or lever 91 after the strip has come to rest, (Figs. 1, 2 and 7). The peripheral surface 52a of a member 52, that is carried by shaft 53, is shown in the form of a cam cooperative with arm or lever 91, which is shown provided with an anti-friction roll 95 to engage the cam, for moving the arm 91 in one direction, said arm having a projection 91a extending at an angle to the plane of the arm to be engaged by said cam, whereby arm 91 will be rocked back and forth during a complete rotation of member 52, (Figs. 1 and 2). The relation of the parts is such that before the tool 84 operates to cut off a blade from the strip the pins 104 will have been pushed by arms 91 and 113 through apertures in the projecting end of the strip, which portion of the strip will become the blade A' when cut off by the tool and will be supported by the pins 104.

Figure 4:
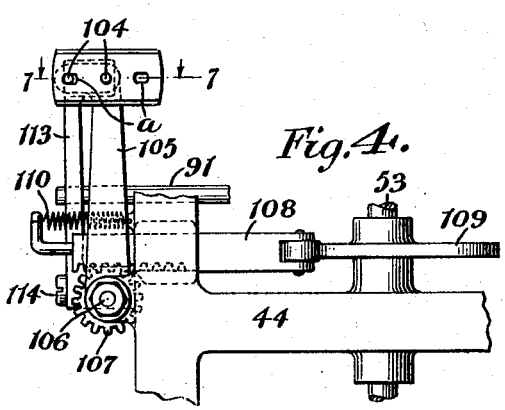
Fig. 4 is a detailed view of the blade-transferring means.
Figure 5:
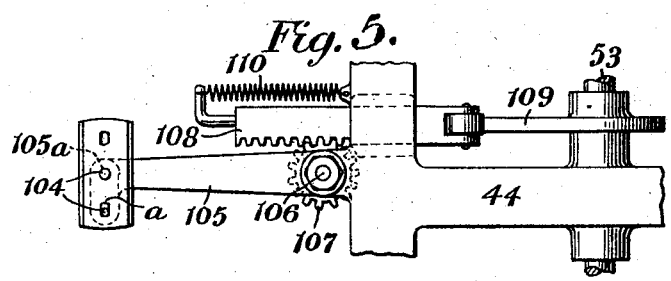
Fig. 5 is a view corresponding to view 4, illustrating the parts in a different position.
Figure 6:
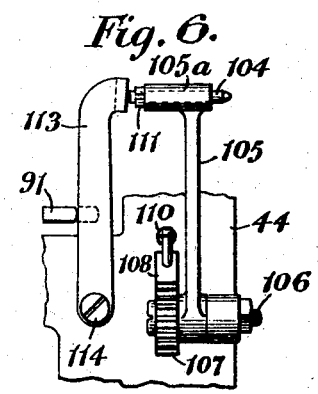
Fig. 6 is a view looking from the left hand side of Fig. 4.

After the blade has been cut off the cam 109 will push the rack 108 from the blade-receiving position in Fig. 4 to the blade transferring or delivering position, (Fig. 5), at which position blade-assembling rods 115 are mounted in alignment or register with the pins 104, (Figs. 2, 8, 9 and 10). The rods 115 are moved toward and from the pins 104, being adapted to engage the pins 104 to push them outwardly from the blade while the rods 115 pass through the corresponding apertures in the blade and enter the bores 105a in arm 105 to receive the blade upon the rods, and then the rods retreat carrying the blade with them and leaving the pins 104 pushed outwardly to be pressed forwardly by arm 113 when arm 105 has returned to blade-receiving position to receive another blade, and so on successively for each blade. Two rods 115 are utilized to receive a blade. The rods 115 are supported in spaced relation and secured at adjacent ends to upright 116a on base 116 that rests on plate 117, the outer ends of the rods being free to receive the blades, (Figs. 1, 3, 11 and 12). Two pairs of rods 115 and corresponding bases 116 are preferably provided to expedite assembling and handling of the completed blades. The bases 116 are shown provided with key-hole-like slots 118, near opposite ends, receiving screws or studs 119 near opposite ends of plate 117, whereby the bases may be placed upon plate 117 and adjusted lengthwise to be held by the screws, and correspondingly removed. Latches 120 are pivoted on plate 117 adapted to be turned behind the corresponding base to retain the latter in cooperation with screws 119 and to be turned to one side to release the base, (Figs. 11 and 12). Plate 117 is supported to reciprocate to move the pins 115 toward and from the blades supported on arm 105 in the blade delivery position of Figs. 5 and 8. Plate 117 is secured by screws 121 to a slide member 122 guided by bearing blocks 123 secured upon a cross-shaped member 124, whose end portions 124a are guided by bearing blocks 125 secured upon a support or saddle 126 that is secured upon frame 1, (Figs. 2, 3, 11 and 12). A pin 127 depends from member 124 through a slot 128 in support 126 and said pin is engaged by the forked end of a lever 129 pivotally supported at 130 on framing 44, (Figs. 1 and 2). A cam 131 secured on shaft 53 rocks the lever 129 to reciprocate the member 124 with member 122, plate 117 and rods 115 towards and from the blades supported on pins 104 for assembling the blades on said rods, (Fig. 8). The member 122 may be manually adjusted laterally respecting the planes of rods 115, to set either pair of rods in register with the pins 104, for which purpose a link 132 is shown pivotally attached at 133 to member 122 and pivotally connected at 134 to a handle 135 that is pivotally supported at 136 on arm 126a extending from support 126 (Figs. 1, 2, 8 and 11). Each time that a plate 117 advances with a pair of rods 115 towards pins 104 said rods will advance through a blade on said pins to successively assemble blades on the rods, and each time after said plate and rods recede from blade receiving position the arm 105 will be rocked upwardly to receive blades and downwardly to retain blades to be assembled on a pair of rods 115. The position of the parts shown in Figs. 1 and 8 represents a pair of rods loaded with a series of blades A' and the adjacent pair of rods in position to receive blades. In such position of the parts the pair of rods 115 having the blades assembled thereon may be removed from plate 117, and a pair of rods may be replaced, during the time that the pair of rods at the right hand side of Fig. 8 is receiving blades. When the last named pair of rods has received a supply of blades the handle 135 may be moved to the right, as in Fig. 11, to correspondingly adjust plate 117 so the last pair of rods will be moved away from blade-receiving position and the other pair of rods will be moved into register with pins 104 on arm 105 to receive blades therefrom, and reversely so that each time that a pair of rods has received a supply of blades the plate 117 will be shifted laterally for removing a pair of rods having blades and replacement of rods.

The operation may be described as follows:

The arm 113 causes pins 104 to pass through apertures or perforations in the blade A' at blade receiving position, whereupon the arm 113 will recede and the arm 105 will be operated to carry the blade on pins 104 to the blade delivery and assembling position, and the appropriate pair of rods 115 will advance through the blade to assemble the latter on the rods, pushing the pins 104 back from the blade into the bores in arm 105. The arm 105 will return to blade-receiving position to receive another blade on the pins 104. The blades are successively assembled on rods 115, and the blades assembled on rods 115 may be removed therefrom for final packaging without danger of injury.

Having now described our invention what we claim is:—

1. Means for assembling blades comprising means to enter perforations in the blades to support and transfer them, devices to cause movement of said blade supporting means from the blade-receiving to blade-delivery position and to return said means to blade-receiving position, receiving devices for the blades at the last named position, and means to cause the receiving devices to enter the perforations in the blades to assemble the blades thereon from the blade supporting means.

2. Means for assembling blades comprising pins adapted to enter perforations in the blades to support them, means movably supporting said pins, and devices to move said means with the pins from blade-receiving to blade-delivery position and return to blade-receiving position, rods adapted to enter perforations in the blades retained by the first named pins, and means to cause said rods to advance into the apertures in the blades to assemble the latter on the rods.

3. Means for assembling blades as set forth in claim 2, in which the rods are in register with the pins in blade delivery position to push the pins from the blades as the rods enter the latter.

4. Means for assembling blades comprising an arm pivotally supported and carrying pins adapted to enter perforations in the blades, devices to move the arm from the blade-receiving to blade-delivery position, means to cause the pins to enter the blades at the blade-receiving position, and means to move the pins and blades relatively to one another for removing the blades from the pins.

5. Means for assembling blades comprising an arm pivotally supported and carrying pins adapted to enter perforations in the blades, devices to move the arm from the blade-receiving to blade-delivery position, means to cause the pins to enter the blades at the blade-receiving position, rods located at the blade delivery position adapted to enter perforations in the blades, and means to move the rods toward and from the blades to receive the blades thereon.

6. Means for assembling blades as set forth in claim 5, in which the rods are in register with the blades in blade-delivery position, and means to advance the rods toward the pins for pushing the latter from the blades and assembling the latter on the rods.

7. Means for assembling blades as set forth in claim 5, including a pair of rods located at blade-delivery position to enter perforations in the blades, and means to reciprocate the rods toward and from the blades for assembling blades on the rods, said rods being in register with the pins in blade-delivery position adapted to push the pins from the blades as the rods enter the latter.

8. Means for assembling blades as set forth in claim 5, including a plurality of pairs of rods located at blade-delivery position, means supporting said rods for movement toward and from the blades to assemble the latter on the rods, and means to move said rods laterally to position either pair of rods in register with perforations in the blades.

9. Means for assembling blades as set forth in claim 5, including a plate, means detachably supporting pairs of rods on the plate, a member supporting said plate, means slidably supporting said member for movement toward and from the blade with the rods, and means movably supporting said plate for lateral displacement relatively to the apertures in the blades for positioning either pair of rods in register with said apertures.

10. Means for assembling blades as set forth in claim 5, including a plate, means detachably supporting pairs of rods on the plate, a cross-shaped member supporting said plate, means slidably guiding end portions of said member for reciprocating the plate and the rods toward and from the blades, means slidably supporting other end portions of the member for lateral displacement of the latter with the plate and rods respecting apertures in the blades, means to reciprocate said member toward and from the blades, and means to move said member laterally to position either pair of rods with respect to apertures in the blades.

11. Means for assembling blades as set forth in claim 5, including a plate, means detachably supporting pairs of rods on the plate, a cross-shaped member supporting said plate, means slidably guiding end portions of said member for reciprocating the plate and the rods toward and from the blades, means slidably supporting other end portions of the member for lateral displacement of the latter with the plate and rods respecting apertures in the blades, means to reciprocate said member toward and from the blades, means to move said member laterally to position either pair of rods with respect to apertures in the blades, bases supporting said rods at adjacent ends leaving the opposite ends of the rods free to enter the blades, and means to detachably retain the bases upon said plate.

12. Means for assembling blades comprising an arm provided with bores, pins slidable in the bores to enter perforations in the blades, means pivotally supporting the arm, gearing to rock the arm from blade-receiving to blade-delivery position and return to blade-receiving position, means to move the pins into perforations in the blades in blade-receiving position, rods at blade-delivery position, means movably supporting said rods in register with the pins in the blades, and means to move said rods into perforations in the blades in contact with the pins therein to assemble the blades upon the rods while pushing the pins from the blades.

13. Means for assembling blades as set forth in claim 12, including means frictionally retaining the pins in set positions in the arm.

HENRY J. GAISMAN.
CONRAD SCHUMACHER.